(12) United States Patent
Messenger (10) Patent No.: US 12,300,125 B2
(45) Date of Patent: May 13, 2025

(54) HYBRID SEMI-DYNAMIC ANIMATED LOGO LAMP, VEHICLE COMPONENT AND VEHICLE

(71) Applicant: MOTHERSON INNOVATIONS COMPANY LIMITED, London (GB)

(72) Inventor: Jacob Heath Messenger, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 159 days.

(21) Appl. No.: 18/188,552

(22) Filed: Mar. 23, 2023

(65) Prior Publication Data
US 2023/0316959 A1    Oct. 5, 2023

(30) Foreign Application Priority Data

Mar. 29, 2022   (EP) ..................................... 22165133

(51) Int. Cl.
*G09F 21/04*     (2006.01)
*B60Q 1/26*      (2006.01)

(52) U.S. Cl.
CPC ........... *G09F 21/04* (2013.01); *B60Q 1/2696* (2013.01); *B60Q 2400/50* (2013.01)

(58) Field of Classification Search
CPC ........ B60Q 1/247–549; B60Q 2400/50; B60Q 2900/40; F21S 43/14; F21S 43/19–195; F21W 2103/00–60; F21Y 2115/10; G09F 21/04
See application file for complete search history.

(56) References Cited

U.S. PATENT DOCUMENTS

| | | | |
|---|---|---|---|
| 2017/0050558 A1 | 2/2017 | Salter et al. |
| 2018/0361915 A1 | 12/2018 | Kuhl et al. |
| 2019/0078373 A1 | 3/2019 | Schulz et al. |
| 2020/0189451 A1 | 6/2020 | Hellin Navarro |
| 2021/0046863 A1 | 2/2021 | Weber et al. |

FOREIGN PATENT DOCUMENTS

| | | | |
|---|---|---|---|
| CN | 208635011 | | 3/2019 |
| CN | 113464897 | | 10/2021 |
| DE | 102019127406 | | 4/2021 |
| KR | 2019 0142890 | | 12/2019 |
| KR | 2067087 B1 | * | 2/2020 ............. B60J 5/047 |

OTHER PUBLICATIONS

European Patent Office, Appl. 22165133.4, European Search Report, Sep. 14, 2022.

* cited by examiner

*Primary Examiner* — Jason M Han
(74) *Attorney, Agent, or Firm* — Jones Day (57) ABSTRACT

A logo lamp assembly to be mounted on a vehicle, comprising, at least one first logo lamp having a fixed image output as light projection configured to be turned on or off; characterized by at least one second logo lamp having an at least partially animated image output as light projection, and being configured to be turned on or off dependent on the fixed image output or an external signal from a control unit, such that the logo lamp assembly is a hybrid semi-dynamic animated logo lamp assembly. Further a vehicle component and a vehicle comprising said logo lamp assembly are provided.

35 Claims, 5 Drawing Sheets

HYBRID SEMI-DYNAMIC ANIMATED LOGO LAMP, VEHICLE COMPONENT AND VEHICLE

CROSS-REFERENCE TO RELATED APPLICATION

This application claims priority to European Application No. 22 165 133.4, filed on Mar. 29, 2022, the entirety of which is incorporated herein by reference.

FIELD

The present disclosure relates to a logo lamp assembly in line with the pre-amble of claim 1. Furthermore, the present disclosure refers to a vehicle component such as a mirror and a vehicle comprising said logo lamp assembly.

BACKGROUND

Logo lamp assemblies have become a quasi-standard in modern vehicles. Typical logo lamp assemblies have been used not only as a welcome sign for a driver, but also to improve security e.g. while entering or exiting a vehicle by projecting an aesthetically pleasing logo adjacent to the vehicle. Logo lamp assemblies must be capable of performing a variety of functions.

However, static image output of logo lamps is limited in their added value. Animated logo lamps are helpful to improve the courtesy and safety. Since logo lamp assemblies are to be arranged in different components of a vehicle their functionality have to be flexible. At the same time the system costs have to be minimized.

EP 3 612 413 A1 discloses a combined approach lamp and logo lamp apparatus for use in an external rear view assembly comprising at least one aperture, the apparatus comprising: a housing comprising a rear view face and a front face with the at least one aperture; a printed circuit board (PCB) mounted adjacent the rear face, the printed circuit board further comprising a power connector, an electronic circuit, a first light source mounted in a first location on the printed circuit board and a second light source mounted in a second location on the printed circuit board; and a transparent lens component comprising a first lens portion and a second lens portion, wherein the housing and the lens component are formed, preferably as a two component moulded part, such that the first lens portion is orientated to focus light from the first light source and the second lens portion is orientated to focus light from the second light source via an optical assembly comprising a logo element, and the first lens portion is angled relative to a plane containing the PCB surface so that the distance from the first light source to an outer surface of the first lens portion is less than the distance from the second light source to an outer surface of the second lens portion, with, in use, the housing being mounted so that the first lens portion and the second lens portion are adjacent the at least one aperture in the side mirror housing.

U.S. Pat. No. 9,869,438 B2 discloses a system for dynamically projecting a logo onto a surface, the system comprising a light source configured to emit light toward the surface, a plurality of rotatable lenses positioned between the light source and the surface, the lenses each being a disc or a plate and having a painted, etched, or plated surface forming an opaque portion, each lens including multiple transparent portions configured to permit some of the emitted light to pass therethrough in a corresponding light pattern, wherein each of the corresponding light patterns forms a different constituent part of the logo and an actuator operable for rotating the lenses with respect to the emitted light in response to a control signal to thereby cause the logo to be progressively constructed and projected onto the surface over a calibrated duration.

At the one hand, only static information can be provided via logo lamp assemblies. But dynamic or animated information are crucial to provide situational information to a user, in particular to a driver. This is in particular relevant in certain driving maneuvers such as parking. In addition, the variety of information of driver assistance systems or camera monitoring systems cannot be presented to the user via static image output. Further a static image output may lead to a habituation of the user, such that the user perceives the image outputs less well. Contrarily, animated image output can attract the attention of a user in particular for highly relevant information.

At the other hand, logo lamp assemblies are typically mounted at movable vehicle components, such as a foldable rear view device for example in form of a wing mirror or a door. Logo lamp assemblies having a static image output cannot compensate the movement of e.g. a foldable mirror. That is, there are specific situations in which the logo lamp assembly has no function or even disturbs the user, e.g. in the case of an arrangement at a trunk lid wherein the light of the image output light dazzles. Arrangements that mechanically move a logo lamp assembly are disadvantageous in that they are constructively very complex and also error-prone. In addition, the assembly and repair work are very costly and time-consuming, wherein at the same time those arrangements are only capable to provide an animated image of a static image output.

Further, it is also a main object of logo lamp assemblies to provide courtesy lighting. Animated image output can improve the sense of well-being and personal connection to a vehicle. In addition, functionalities such as animated searching lighting are not provided by static image output. Even less can such a logo lamp assembly meet individual situations in which situational lighting of areas outside or inside a vehicle is relevant.

Replacing common high resolution logo lamps having a static image output with e.g. digital light processing devices are not practically feasible. Such technologies in fact provide a high-resolution animated image output, but the costs are tremendously high and thus their commercial application in the mainstream automotive market is very limited. On the other hand, replacing the common high resolution logo lamps having a static image output with digital microLEDs having an animated image output would cause a low resolution image.

In view of the aforementioned drawbacks and other inherent in the existing state of the art, it is an object of the present disclosure to further develop the known logo lamp assembly to overcome at least some of these drawbacks. In particular it is the object to provide a generally high resolution logo lamp assembly including the feature of animated image output, wherein the system costs are minimized but the effects and functionality of the animated images are maximized.

SUMMARY

A logo lamp assembly according to embodiments of the present disclosure comprises at least one second logo lamp having an at least partially animated image output as light projection, and being configured to be controlled, e.g. turned on or off, dependent on at least one of the fixed image output and a signal, in particular an external signal from a control unit, such that the logo lamp assembly is a hybrid animated logo lamp assembly. On the one hand, this arrangement produces a high-resolution image, and on the other hand, the user hardly notices the lower resolution of the animated image portion. In addition, the system costs are very low compared to the high resolution fully animated digital logo lamps. The term "hybrid animated logo lamp assembly" covers embodiments with the first and second logo lamp being arranged remotely from each other but still cooperate.

Within this disclosure the meaning of hybrid is characterized by the existence of two different types of logo lamps that are combined within one logo lamp assembly. Furthermore, it is understood, that not only the first logo lamp but also the second logo lamp can be turned on and off, wherein both lamps are adapted to at least partially dim the image output. But within the present disclosure, it is focused on the animated image functionality, which is a distinguishing feature of the second logo lamp compared to the first logo lamp. Furthermore, the term logo lamp is well known by a person skilled in the art. Such a logo lamp is adapted to project an image that may comprise one or more colors and is characterized by contours. Such contours can result from different colors or from lighter and darker areas. In certain embodiments, the main or only color of the projected light of the logo lamp assembly is white. In addition, the projected light of the logo lamp assembly may be yellow, red, amber or any other color. Still further, the at least one lens or image in one of the logo lamps may be colored to color at least a part or all of the image output. The feature of the semi-dynamic logo lamp is related to a logo lamp assembly that is capable of projecting several static images, wherein the term animated is related to a logo lamp that is capable of projecting an at least partially animated image output.

In a further embodiment the light projection axes of the at least one first logo lamp and the at least one second logo lamp may be identical and/or parallel and/or coaxial. Thus, the light projection axes may have an intersection point before the image output reaches the surface on which the image is displayed. According to a further embodiment the projection axes of at least two of the first and/or second logo lamps may differ from each other. The projection axis is defined by the main projection direction of a logo lamp and may be perpendicular to the image. The alignments of the projection axes apply to any embodiment of a logo lamp assembly and/or combination of logo lamps, regardless of whether they are first and/or second logo lamps. The characteristic of parallel axes refers to having two vertical planes with the same normal, whereas the characteristic of coaxial axes refers to having only one plane with the same normal.

Furthermore, it is proposed with the present disclosure, that the projection axes of any of the first and/or second logo lamps may be different to allow a greater coverage of projection area by the respective image outputs. The projection area is defined by the area of illumination that results from the projected image output, wherein scattered light is not included within the meaning of the projection area.

It is also proposed by the present disclosure that the at least one second logo lamp may be adapted to compensate at least partially a movement of at least one first logo lamp or the logo lamp assembly, e.g. due to a movement of a vehicle component such as a foldable mirror or an openable door to which the logo lamp assembly is attached to. Furthermore, such an animated image output of at least one second logo lamp may be a link between at least two static image outputs of at least two first logo lamps.

It is also proposed by the present disclosure that the image output of the logo lamp assembly may be at least partially colored white, and/or the image output of the logo lamp assembly is at least partially colored yellow, red, amber, blue, grey, black or any other color; and/or the at least one first logo lamp and the at least one second logo lamp or the logo lamp assembly may comprise at least one lens, wherein preferably the at least one lens may be at least partially colored white, grey, black, yellow, red, amber, blue or any other color or any combination of these colors.

Furthermore, the at least one first logo lamp may be a semi-dynamic logo lamp, wherein the semi-dynamic logo lamp is adapted to project a series of image outputs comprising at least two different images, such that the logo lamp assembly is a hybrid semi-dynamic animated logo lamp assembly. However, those image outputs are still static in their nature. In addition, it is proposed with the present disclosure that said image output may depict a vehicle drawing or representation, a brand logo, any traffic related logo like a traffic sign or the like or any combination of these.

The logo lamp assembly, according to the present disclosure, may comprise at least one second logo lamp, wherein the second logo lamp may be adapted to project a fully animated image output. In Addition, it is proposed with the present disclosure, that at least one second logo lamp of the hybrid semi-dynamic animated logo lamp assembly may comprise at least one microLED preferably having a lower resolution image output compared to the image output of the first logo lamp. The lower resolution of the second logo lamp may be less than 100 k pixels. The term "microLED" are also covers digital or matrix LEDs.

In a further embodiment of the hybrid semi-dynamic animated logo lamp assembly the second logo lamp may be adapted to project an, preferably at least partially animated, image showing an entrance or car handshake effect. These effects are characterized by projecting an at least partially animated image output, that welcomes the user when approaching the vehicle or entering or exiting it. These effects can be personalized or brand-related.

Furthermore, it is proposed with the present disclosure that the first or second logo lamp may be adapted to project an information containing image output. The information may be text based (e.g. showing a letter, a combination of letters, a courtesy information such as "welcome", a warning such as "stop" or "driver door is open", a punctuation mark such as "!" (exclamation mark) and/or a combination of these) and/or may contain a traffic related signal (e.g. a traffic sign or traffic light) and/or may contain an information logo indicating warnings and/or conditions of vehicle components (e.g. a logo showing an opened trunk lid or a snow icon).

Furthermore, it is proposed with the present disclosure that the logo lamp assembly may comprise at least one attachment means for, in particular detachably, attaching the logo lamp assembly to a vehicle component, and/or at least one connector means for connecting the at least one logo lamp assembly with a power supply and/or the control unit The present disclosure, moreover, provides a vehicle component such as a rear view device, a side mirror, a door, a camera pod, a trunk lid, a spoiler, a hood, a bumper, a side skirt, a roof rail, a pillar or a fender comprising at least one logo lamp assembly outlined above.

In a further embodiment of the vehicle component a control unit may be adapted for controlling the at least one logo lamp assembly, depending on at least one of a driving situation, a driver condition, a driving purpose, a weather condition and a traffic condition. Further, the vehicle component may be configured to be moveable relative to a vehicle to which it is mounted. Thus, the logo lamp assembly may be adapted to provide dynamic area lighting such as courtesy or maneuvering lamp functionality. Dynamic area lighting is the capability to dynamically illuminate areas in the near vicinity of the vehicle, wherein the illumination of these areas are of interest during specific situation. Those situation can occur e.g. during driving maneuvers such as parking (maneuvering lamp functionality) or during non-driving-related use of the vehicle e.g. getting in and out of a vehicle (courtesy lamp functionality).

In addition, the vehicle component may further comprise at least one sensor adapted to sense at least one of a driving situation, a driver condition, a driving purpose, a weather condition, a traffic condition and a movement of the vehicle component. In another embodiment of the vehicle component the movement of the vehicle component may be at least partially compensated by at least one animated image output of one logo lamp assembly and/or by the image output of at least two logo lamp assemblies. In yet another embodiment at least one of the at least one logo lamp assembly and the vehicle component may be configured to be controlled by a remote control unit or from inside the vehicle.

In addition, embodiments of the present disclosure provide a vehicle with at least one logo lamp assembly outlined above and/or at least one vehicle component outlined above. According to another embodiment, the vehicle may comprise at least two logo lamp assemblies. The logo lamp assemblies may be located at different locations, in particular at different components of the vehicle.

It is further proposed, that the control unit may be comprised by the vehicle for controlling the at least one logo lamp assembly depending on at least one of a driving situation, a driver condition, a driving purpose, a weather condition and a traffic condition.

In another embodiment, the vehicle may further comprise at least one further sensor adapted to sense at least one of a driving situation, a driver condition, a driving purpose, a weather condition, a traffic condition and a movement of the vehicle component.

Furthermore, in embodiments, the vehicle may be characterized in that, at least one hybrid logo lamp assembly is adapted to provide dynamic area lighting during parking maneuvering, wherein the image output of said logo lamp assembly illuminates areas outside the main projection areas of the vehicle headlights, in particular in the near vicinity of the vehicle.

In a further embodiment at least one logo lamp assembly may be fixed, mounted or moveable to project the image output onto at least one of at least one interior surface of the vehicle, the ground surrounding the vehicle and at least on exterior surface of the vehicle. Thus, according to an embodiment at least one logo lamp assembly of a vehicle may be adapted to project at least partly the image output into the interior of the vehicle.

It is also proposed by the present disclosure that at least one logo lamp assembly may be arranged in the interior of the vehicle and/or at least one logo lamp assembly may be arranged in the exterior of the vehicle and/or at least one logo lamp assembly is movable.

In addition, in embodiments, at least one logo lamp assembly may be adapted to be connected and at least partially controlled by a camera monitoring system and/or a fifth logo lamp assembly of the vehicle may furthermore be adapted to dynamically adapt the light projection of the image output along a 2D or 3D surface. Such a 2D or 3D surface is a surface of an object outside the vehicle such as a curb, a wall, a road user, another vehicle, an animal, an obstacle, a person or the course of a road or its crash barrier or the like. In order to adapt the image output according to a 2D or 3D surface, data of the 2D or 3D surface is needed. Therefore, calculation methods for a recorded image can be applied in order to calculate the 2D and/or 3D surface. It is also possible to use 2D or 3D data that is obtained e.g. from a radar, infrared or laser device or the like.

According to another embodiment it is proposed that at least one second logo lamp of at least one logo lamp assembly may be adapted to move the at least partially animated image output at least partially around the vehicle and/or along a pathway that may lead around the vehicle. Such common pathways are e.g. the pathway from the driver door to the trunk. In addition, within the meaning of the pathway it may also be included that not only the pathway, on which the users may walk, is illuminated but also the areas of interest which are relevant to be illuminated in the near vicinity of the vehicle. Such areas can include the area between the vehicle and a sidewalk or obstacles or the like.

Furthermore it is proposed according to embodiments of the present disclosure that at least one logo lamp assembly may comprise at least one first and at least one second logo lamp, wherein the projection axes of those first and second logo lamps may cross a pathway at different points. Thus, within the present disclosure the light projection areas of the first and second logo lamps may meet and/or overlap. In addition, further first and/or second logo lamps may extend the illumination of the pathway towards other areas of interest e.g. obstacles, curbs, sidewalks or the like.

Furthermore it is proposed with embodiments of the present disclosure that the interior surface may be selected from a group of at least a windshield, a window, a plastic surface and a textile cover and/or the exterior surface of the vehicle is selected from a group comprising at least a rear view devise, a side mirror (9), a door, a camera pod, a trunk lid, a spoiler, a hood, a bumper, a side skirt, a roof rail, a pillar and a fender. According to another embodiment the at least one logo lamp assembly of a vehicle may be adapted to project at least a part of the image output against a windshield or against any other glass or window of the vehicle or against any part of the vehicle, regardless, whether said part is arranged at the interior or exterior of the vehicle. In regard of the term exterior it is included that the logo lamp assembly is capable to illuminate exterior surfaces or areas of the vehicle such as a door. This allows the user to e.g. read the own name or a logo on the door of the vehicle while searching for the vehicle in the dark or project relevant information in the field of view of the user during driving maneuvers e.g. during parking spotting an information logo on the windshield.

Furthermore, in embodiments, the image output of one logo lamp assembly may meet at least one image output of another logo lamp assembly. In this case, the light projection areas may at least meet each other or may overlap. This ensures, that the whole pathway and/or area of interest may be illuminated.

According to another embodiment the vehicle may further comprise at least one further sensor adapted to sense at least one of a driving situation, a driver condition, a driving purpose, a weather condition, a traffic condition and a movement of a vehicle component to which one logo lamp assembly is mounted. Those sensors can send their signals directly to the logo lamp assembly or to a control unit, that controls the logo lamp assembly.

According to another embodiment, it is proposed, that the vehicle may further comprise an input unit being adapted for controlling at least partially one logo lamp assembly and/or preferably the input unit being adapted to insert and/or input an information, preferably a text, to at least one logo lamp assembly that can be displayed with the image output of the at least one logo lamp assembly and/or the vehicle further comprises at least one output unit for outputting an or the information, preferably comprising a text. In embodiments the input unit may be a keyboard or a touchscreen or at least one button or a combination of these.

Furthermore, it is proposed, that in embodiments, the movement of a vehicle component may be at least partially compensated by at least one animated image output of one logo lamp assembly and/or by the image output of at least two logo lamp assemblies.

In a further embodiment the vehicle may further comprise a remote control unit adapted to control at least one logo lamp assembly and/or at least one movable vehicle component. Said remote control unit may for example be a part of a key-less system of the vehicle.

Other aspects, advantages, and salient features of the present disclosure will become apparent to those skilled in the art from the following detailed description, which taken in conjunction with the annexed drawings, discloses exemplary embodiments of the disclosure, wherein:

DETAILED DESCRIPTION

The following description of embodiments is for the purpose of illustrating the disclosure only, but not for the purpose of limiting the same as defined by the appended claims. Furthermore, the drawings referred to in this description are not to be understood as being drawn to scale except if specifically noted.

The term "comprises", "comprising", "including", "having", "consist of" or any other variations indicate non-exclusive inclusion in order to cover a setup, structure or method that comprises a list of components or steps does not include only those components or steps but may include other components or steps not expressly listed or inherent to such setup or structure or method. It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the disclosure or the appended claims. Further, it should be understood that any one of the features of the disclosed and claimed subject matter may be used separately or in combination with other features.

Referring to the embodiments of FIGS. 1 to 5 a hybrid semi-dynamic animated logo lamp assembly for illuminating areas outside the vehicle is illustrated. The arrangement of the logo lamp assembly as well as the comprised logo lamps may be varied such that the image output may also illuminate areas of the interior of the vehicle. However, in the following description, the logo lamp assemblies are chosen so that illumination is only projected outside the vehicle. The chosen image outputs are simplified. Thus, the image output of the logo lamps can have any shape, e.g. circular, rectangular, etc., and depict any desired image as a logo.

Figure 1:
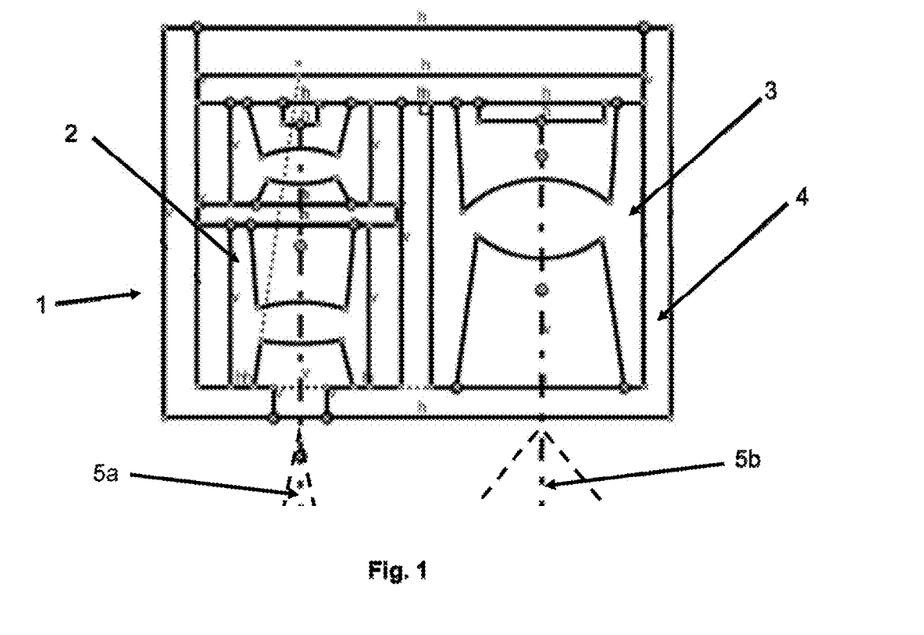
FIG. 1 is a schematic diagram illustrating a first embodiment of a hybrid semi-dynamic animated logo lamp according to the present disclosure.

FIG. 1 shows a first embodiment of the logo lamp assembly 1 that comprises one first logo lamp 2, which is capable of projecting a static image output, and one second logo lamp 3, which is capable of projecting an animated image output 7. According to the embodiment of FIG. 1 the first logo lamp 2 is a static logo lamp, since it contains a single lens stack with a fixed image. Thus, the first logo lamp 1 is capable of projecting one static image. Since the second logo lamp 3 is fully animated, the second logo lamp 3 is capable of projecting the respective animated image output 7 appropriate to the situational boundary conditions and the image output 6 of the first logo lamp 2.

Figure 4:
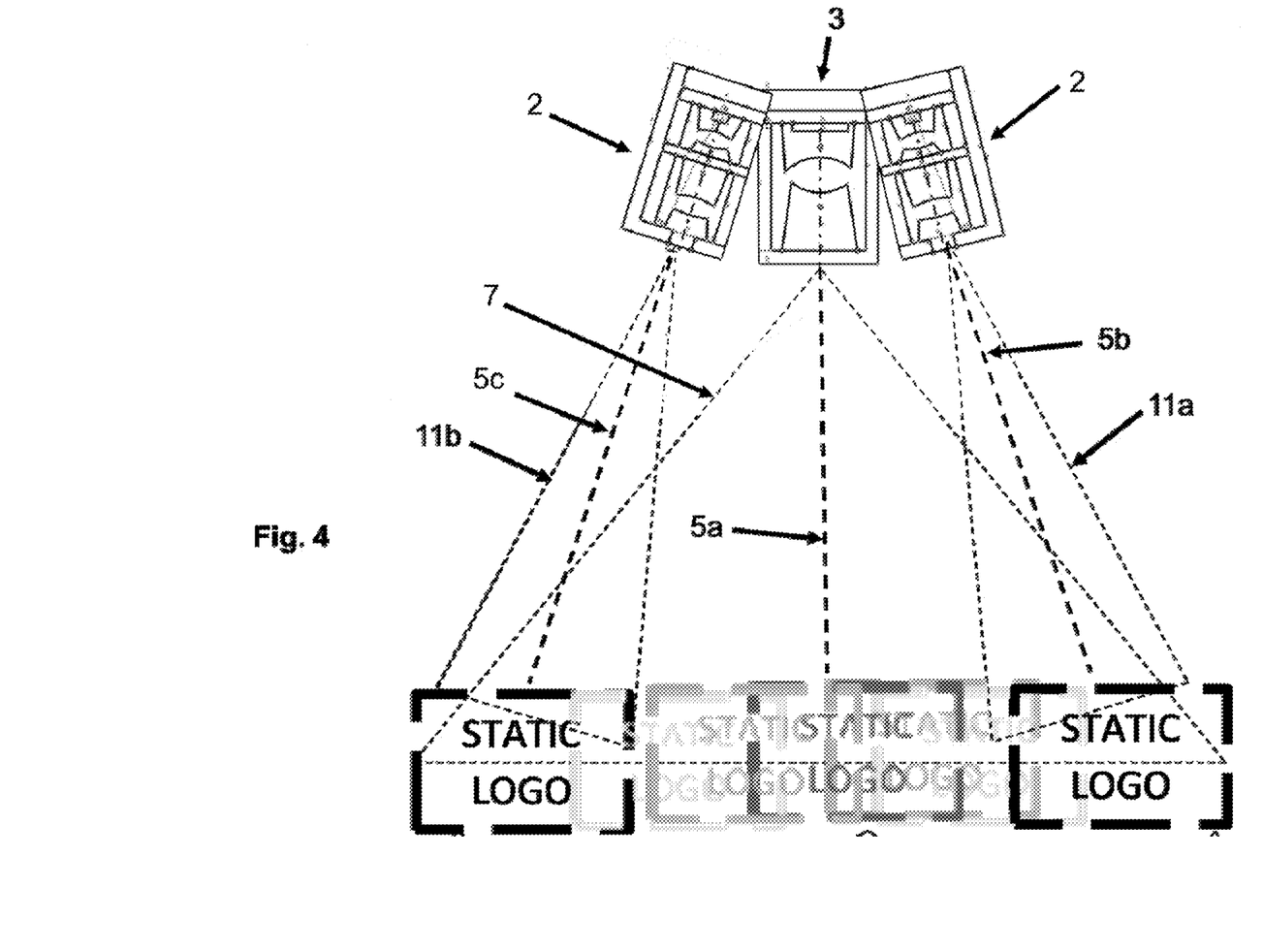
FIG. 4 is a schematic diagram illustrating a second embodiment of a hybrid semi-dynamic animated logo lamp according to the present disclosure with two second logo lamps including an example of image outputs.
Figure 5:
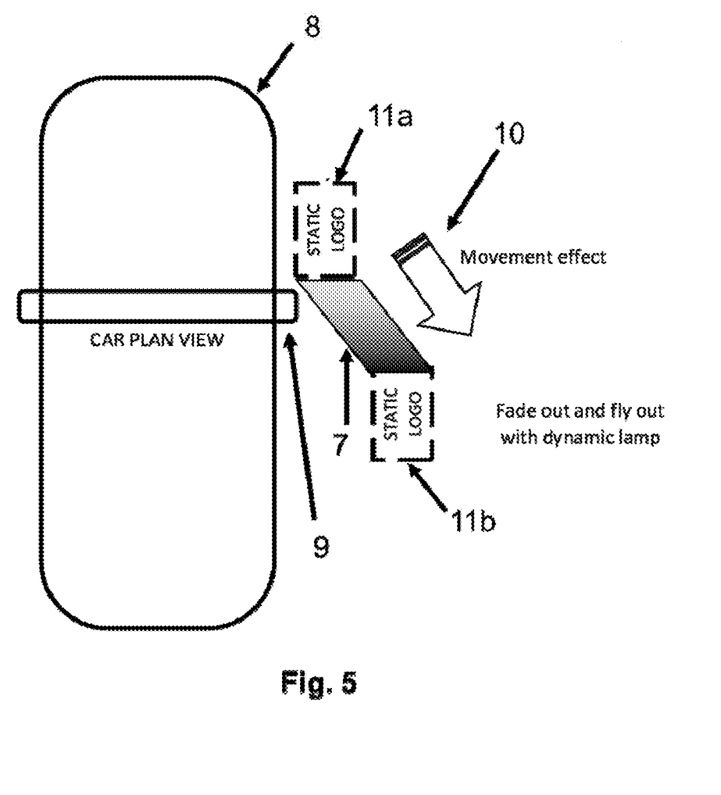
FIG. 5 is a schematic diagram illustrating the hybrid semi-dynamic animated logo lamp of FIG. 4 mounted on a rear view device (side mirror) of a vehicle.

According to other embodiments, the functionality of a semi-dynamic logo lamp may be provided by several first logo lamps 2, see e.g. FIGS. 4 and 5, that may be arranged in one or several logo lamp assemblies 1. In further embodiments the logo lamp assembly 1 may comprise a combination of semi-dynamic and non-semi-dynamic first logo lamps 2, capable of projecting a static image or a series of static images.

Based on the arrangement according to the embodiment of FIG. 1, a combination of both image outputs (simultaneous projection) or a sequential projection is possible, wherein the first logo lamp 2 projects a static image e.g. a representation of a vehicle or a logo as the basic image and the second logo lamp 3 projects an animated image e.g. opening a door of the represented vehicle or movement of the logo as a situational changing image. Due to the high resolution static image output 6 of the first logo lamp 2, the user substantially does not or only in a diminished way notice the lower resolution of the animated image output of the second logo lamp 3.

In embodiments several first and/or second logo lamps 2, 3 can be arranged within one logo lamp assembly 1. While the projection axes 5a, 5b, 5c of the first and second logo lamps 2, 3 according to the embodiment of FIGS. 1 and 2 are coaxial, in other embodiments the alignment of the projection axes 5a, 5b, 5c may be different (e.g. see FIG. 4).

Figure 2:
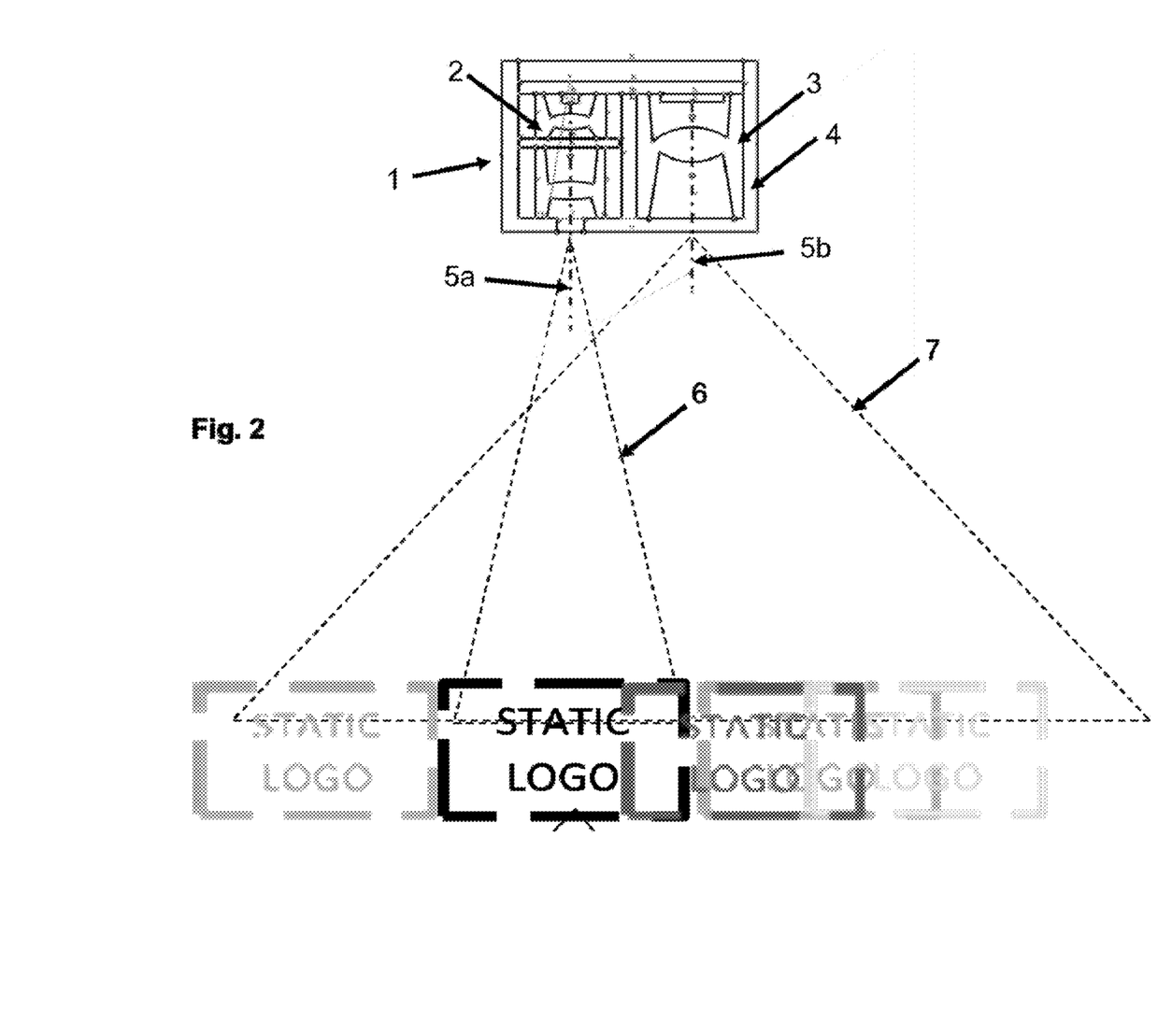
FIG. 2 is a schematic diagram illustrating the hybrid semi-dynamic animated logo lamp of FIG. 1 including an example of image outputs.

FIG. 2 shows an example of an image output of the logo lamp assembly 1 of FIG. 1. The static image output 6 of the first logo lamp 2 projects a high resolution static image. The animated image output 7 of the second logo lamp 3 projects a lower resolution dynamic image output, providing as an example an animation of the logo of the static image output 6. Due to the coaxial arrangement of the projection axes 5a, 5b, 5c, the animation of the logo moves along an axis perpendicular to the projection axes 5a, 5b, 5c. Such an animation may include entrance effects such as fade, translate or star fall. In FIG. 2 frames of fading in are shown exemplarily.

According to the second embodiment of FIG. 4, the logo lamp assembly 1 comprises two first logo lamps 2 having a static image output and one second logo lamp 3 having an animated image output. In the embodiment of FIG. 4 the first logo lamps 2 are static logo lamps, since each of them comprise two lenses, each with a fixed image. Thus, the first logo lamps 2 are each capable of projecting different static images. Since the second logo lamp 3 is fully animated, the second logo lamp 3 is capable of projecting the animated image output 7 appropriate to the image output 11a, 11b of the first logo lamps 2.

According to the embodiment of FIG. 4 at least one first logo lamp 2 projects the basis image output, wherein according to other embodiments at least one second logo lamp 3 projects the basic image output. In further embodiments a combination of at least one first logo lamp 2 and at least one second logo lamp 3 projects the basic image. According to the embodiment of FIG. 1, the first logo lamp 2 projects a basic image wherein the second logo lamp 2 projects the situational changing image.

According to the embodiment of FIGS. 1, 2 and 4, the second logo lamp 3 is a dynamic digital microLED lamp that is capable of projecting a fully animated image output 7. In other embodiments the second logo lamp 3 is capable of projecting a partially animated image output.

The alignment of the projection axes 5a, 5b, 5c of the logo lamps in general is important to the illumination functionality of the overall output image. For example, if the projection axes 5a, 5b, 5c are coaxial, the image outputs 6, 7, 11a, 11b may at least partially or fully overlap or they are projected adjacent to each other. The arrangement of the projection areas applies not only to the combination of the image outputs 6, 7, 11a, 11b of the first and second logo lamps 2, 3 but also to the combination of the group of first logo lamps 2 and the group of second logo lamps 3, that are arranged in one logo lamp assembly 1. That is for example, the static image outputs 6, 11a, 11b of several first logo lamps 2 can be partially or fully overlapping or they are projected adjacent to each other, and the timing of the operation (projection of image output 6, 11a, 11b) of the first logo lamps 2 may also overlap or vary. The temporal and spatial arrangement also applies to the image outputs 7 of the several second logo lamps 3, if existing (not shown). Furthermore, those spatial and temporal arrangements apply to any combination of logo lamps 2, 3, regardless of whether they are first and/or second logo lamps 2, 3. According to the embodiment of FIGS. 1 and 2 the projection areas of the image outputs 6, 7 fully overlap. According to the embodiment of FIG. 4 the projection areas of the static image outputs 11a, 11b do not overlap, but both of them overlap with the animated image output 7 of the second logo lamp 3.

Figure 3:
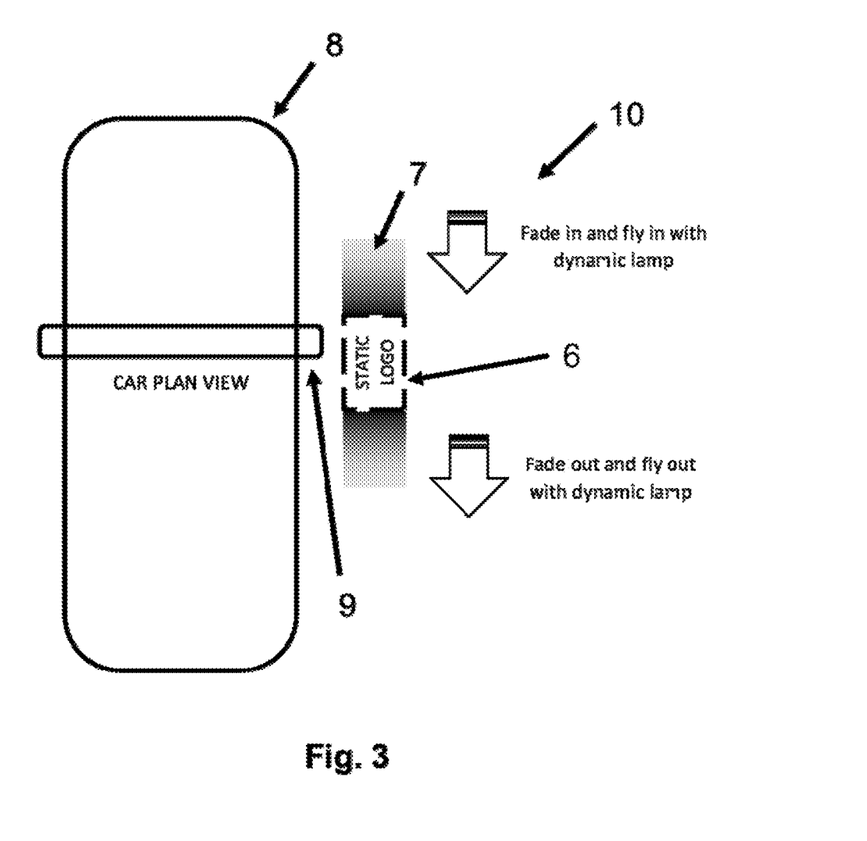
FIG. 3 is a schematic diagram illustrating the hybrid semi-dynamic animated logo lamp of FIGS. 1 and 2 mounted on a rear view device (side mirror) of a vehicle.

The logo lamp assembly 1 according to FIGS. 1, 2 and 4 is provided to be mounted on a mirror head of a side mirror 9 of a vehicle 8. Therefore, the second logo lamp 3 of the embodiment of FIGS. 1 and 2 is adapted to e.g. compensate the movement of a foldable mirror, such that the user regardless of the mirror movement can see the full logo. Furthermore, the second logo lamp 3 can show entrance effects such as fading in and out effects of the projected logo. These effects are illustrated in FIG. 3, with fading in/out and flying in/out functionality of the animated image output 7.

The projection areas 6, 7 of the first and second logo lamp 2, 3 at least partially overlap depending of the position of the animated logo 7.

According to the embodiment of FIG. 5, which shows the logo lamp assembly of FIG. 4 mounted on a side mirror 9 of a vehicle 8, the logo lamp assembly 1 is adapted to compensate the movement of a door opening. Therefore, two first logo lamps 2 are adapted to project a static image output 11a, 11b, wherein the second logo lamp 3 is adapted to project an animated image output 7 in form of a movement effect 10 that links the static image outputs 11a, 11b of both first logo lamps 2.

In other embodiments the logo lamp assembly 1 may be mounted elsewhere on the vehicle 8, in particular on vehicle components such as a door, a camera pod, a trunk lid, a spoiler, a hood, a bumper, a side skirt, a roof rail, a pillar or a fender, wherein the second logo lamp 3 is capable of providing courtesy or maneuvering lamp functionality and/or compensating the movement (if existing) of such a component, e.g. a door or a trunk lid or any other movable component of a vehicle 8.

The image output 6, 7, 11a, 11b of the first and/or second logo lamp 2, 3 may be a text as shown in FIGS. 2 and 4. Preferably a brand logo, a car logo, a vehicle representation, a message logo on/for the driver (policeman, fireman, taxi driver or the like) and/or any traffic related logo like a traffic sign and/or a combination of letters or the like is projected. According to other embodiments a combination of these logos is projected. For example, at least one first logo lamp 2 projects a representation of a car, wherein at least one second logo lamp 3 is adapted to project a text and/or a moving brand logo. In further embodiments the first and/or second logo lamp 2, 3 is adapted to project an information containing image output 6, 7, 11a, 11b such as a text based information, a traffic related signal (e.g. a traffic sign or traffic lights), an information logo indicating warnings and/or conditions of vehicle components or a combination of these. In another embodiment the animated image output 7, 11a, 11b of the second logo lamp 3 attracts attention by e.g. flashing at least partly e.g. red projection areas, by blinking signals or text, by showing a running text or by a combination of these.

According to another embodiment, regardless of the image output 6, 7, 11a, 11b, the logo lamp assembly 1 is connected to driver actions of the vehicle 8. This can be accomplished by e.g. a control unit, a direct connection with the e.g. the gearshift and/or a sensor or other similar units known by those skilled in the art. In such an embodiment the logo lamp assembly 1 is capable of providing illumination according to the driver actions e.g. during overtaking maneuvers, parking maneuvers or the like. In other words, the logo lamp assembly 1 is capable to adapt the image output to the driver's or vehicle's 8 actions thus dynamically illuminates specific areas of interest. Weather conditions may also have impact on the logo lamp 2, 3 output(s).

In another embodiment, wherein several logo lamp assemblies 1 are arranged at different locations around a vehicle 8, the several logo lamp assemblies 1 may be interconnected. Thus, according to the areas of interest, the appropriate logo lamp assembly 1 or an appropriate combination of logo lamp assemblies 1 illuminates the respective areas of interest. These areas of interest are preferably outside the main illumination areas of the vehicle's 8 headlights and in the near vicinity of the vehicle 8.

According to another embodiment, one or more logo lamp assemblies 1 are arranged in the interior of a vehicle 8. Depending of the status of a vehicle component, such as an opening door, the logo lamp assembly 1 is movably mounted and dependent on the component's status the image output 6, 7 is located at the interior or exterior of the vehicle 8.

According to the embodiments of FIGS. 3 and 5 the logo lamp assembly 1 is rigidly mounted on the exterior (side mirror 9) of the vehicle 8 and the image output 6, 7, 11a, 11b is projected on the ground in the near vicinity of the vehicle 8. In further embodiments, regardless whether the logo lamp assembly 1 is mounted at the ex- or interior of the vehicle 8, at least partially the image output 6, 7, 11a, 11b is projected in the interior of the vehicle 8. In a further embodiment, the logo lamp assembly is adapted to illuminate the step of a door (interior) and at the same time the sidewalk or a puddle outside the vehicle 8. In a further embodiment of a vehicle 8 comprising several logo lamp assemblies 1, wherein at least one logo lamp assembly 1 is adapted to project at least partially the image output 6, 7, 11a, 11b against a windshield. In other embodiments the image output 6, 7, 11a, 11b is at least partially projected against another window or glass or another surface on which the user can perceive the image output 6, 7, 11a, 11b e.g. during driving maneuvers. In yet another embodiment either the first or the second logo lamp 2, 3 is capable of projecting at least partially the image output 6, 7, 11a, 11b against a glass, window, windshield and/or surface of the interior. According to another embodiment, the logo lamp assembly 1 is capable to illuminate at least partly an external surface such as a door of a vehicle 8 and preferably projects a welcome logo or e.g. the name of the user against said surface.

According to another embodiment, a logo lamp assembly 1 is connected with and at least partially controlled by a camera monitoring system (CMS). Such CMS systems are used in vehicles 8 for the safety of road users and passengers. For example, CMS systems include camera wings that replace the exterior mirrors 9 or driving assistance systems that support parking or lane keeping or distance keeping or emergency braking situations. In an embodiment said CMS system is capable of providing 2D or 3D data of surfaces and objects around the vehicle 8. In one embodiment said data is obtained by an algorithm that calculates the data from recorded images in another embodiment the CMS system comprises a 3D sensor such as a radar apparatus or the like that provides said 2D or 3D data. However, in a further embodiment the logo lamp assembly 1 is configured to adapt the image output 6, 7, 11a, 11b based on the 2D and/or 3D data. According to an embodiment, the logo lamp assembly 1 is capable to illuminate the sidewalk with the static image output 6, 11a, 11b of the first logo lamp 2, wherein with the image output 7 of the second logo lamp 3 the 3D course of the step of the sidewalk is highlighted e.g. with a red line in order to prevent stumbling of a vehicle occupant when entering or exiting the vehicle. According to another embodiment, the logo lamp assembly 1 provides dynamic lighting as outlined above during a driving maneuver, wherein the second logo lamp 3 is capable to project logos, which can be a line, a plurality of lines or any other image, that follow the 3D surface of obstacles or surfaces in the near vicinity of the vehicle 8 in order to visually support the driver preventing collisions.

According to another embodiment it is the purpose of the logo lamp assembly 1 or a series of logo lamp assemblies 1 to provide illumination of a defined pathway e.g. around the vehicle 8. Therefore, the logo lamp assembly 1 according to an embodiment has a projection axis 5a of the first logo lamp 2, that crosses the pathway at a different point compared to the projection axis 5b, 5c of the second logo lamp 3. In another embodiment, the logo lamp assembly 1 comprises several first and second logo lamps 2, 3, wherein the point of intersection between the projection axes 5a, 5b, 5c are different and follow the defined pathway. According to the embodiment of FIG. 5 the logo lamp assembly 1 comprises two first and one second logo lamp 2, 3, wherein the image outputs 11a, 11b of both first logo lamps 2 define two areas of a predefined path of a driver leaving the car and wherein the second logo lamp 3 is adapted to illuminate the path between both first image outputs 11a, 11b. In another embodiment, a pair of a first and a second logo lamp 2, 3 has the same intersection point between the projection axes 5a, 5b, 5c and the defined pathway. Some or all of the resulting projection areas 6, 7, 11a, 11b may overlap.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims. I.e. the features disclosed in the foregoing description, the claims, and the drawings may be essential, both individually and in any combination, for accomplishing the present disclosure in its various embodiments.

REFERENCE SIGNS

1 hybrid semi-dynamic animated logo lamp assembly
2 first logo lamp with static image output
3 second LED logo lamp with animated low resolution image output
4 housing
5a, 5b, 5c projection axis
6 High resolution static image output
7 Low resolution animated image output
8 Vehicle
9 Rear view device (side mirror) with a hybrid semi-dynamic animated logo lamp
10 Arrows indicating a possible movement of the animated image output
11a, 11b High resolution static image output

What is claimed is:

1. A logo lamp assembly to be mounted on a vehicle, comprising:
a first logo lamp having a fixed image output as light projection configured to be turned on or off; and
a second logo lamp having an at least partially animated image output as light projection, and being configured to be controlled dependent on at least one of
the fixed image output, or
an external signal from a control unit,
wherein the logo lamp assembly is a hybrid animated logo lamp assembly, and
wherein the logo lamp assembly to be mounted on the vehicle is selected from a group consisting of:
a first logo lamp assembly configured to provide dynamic area lighting during parking maneuvering, wherein an image output of the first logo lamp assembly is configured to illuminate areas outside of main projection areas of vehicle headlights in a near vicinity of the vehicle;
a second logo lamp assembly that is to configured to be fixed, mounted or moveable to project the image output onto at least one of an interior surface of the vehicle, ground surrounding the vehicle, or an exterior surface of the vehicle;

a third logo lamp assembly that is configured to be disposed in an interior of the vehicle or at an exterior of the vehicle;
a fourth logo lamp assembly that is movable;
a fifth logo lamp assembly that is configured to be connected with and at least partially controlled by a camera monitoring system;
a sixth logo lamp assembly that is configured to dynamically adapt the image output along a 2D surface;
a seventh logo lamp assembly with the second logo lamp being configured to move the at least partially animated image output at least partially around the vehicle and/or along a pathway; and
an eighth logo lamp assembly wherein projection axes of the first and second logo lamps cross the pathway at different points.

2. The logo lamp assembly of claim 1, wherein the second logo lamp comprises a micro LED or a matrix microLED with more than 1000 pixels.

3. The logo lamp assembly of claim 2, wherein the second logo lamp has a lower resolution image output compared to the fixed image output of the first logo lamp.

4. The logo lamp assembly of claim 3, wherein the lower resolution of the second logo lamp is less than 20 million or 100.000 pixels.

5. The logo lamp assembly of claim 1, wherein the first logo lamp and the second logo lamp have light projection axes as main projection directions of the first and second logo lamps, which are at least one of identical, parallel, or coaxial.

6. The logo lamp assembly of claim 1, wherein light projection axes of the first and second logo lamps differ from each other.

7. The logo lamp assembly of claim 6, wherein the light projection axes have an intersection point before the image output reaches a surface on which an image is displayed.

8. The logo lamp assembly of claim 1, wherein the second logo lamp is configured to compensate at least partially a movement of the first logo lamp or the logo lamp assembly.

9. The logo lamp assembly of claim 1, wherein an image output of the logo lamp assembly is at least partially colored white.

10. The logo lamp assembly of claim 1, wherein; an image output of the logo lamp assembly is at least partially colored yellow, red, amber, blue, grey, black or any other color.

11. The logo lamp assembly of claim 1, wherein the first logo lamp and the second logo lamp or the logo lamp assembly include a lens.

12. The logo lamp assembly of claim 11, wherein the lens is at least partially colored white, grey, black, yellow, red, amber, blue or any other color or any combination of colors.

13. The logo lamp assembly of claim 1, wherein the first logo lamp is a semi-dynamic logo lamp, wherein the semi-dynamic logo lamp is configured to project a series of image outputs including at least two different images, such that the logo lamp assembly is a hybrid semi-dynamic animated logo lamp assembly.

14. The logo lamp assembly of claim 1, wherein the at least partially animated image output is a fully animated image output.

15. The logo lamp assembly of claim 1, further comprising:
an attachment means for detachably attaching the logo lamp assembly to a vehicle component.

16. The logo lamp assembly of claim 1, further comprising:
at least one connector means for connecting the logo lamp assembly with a power supply and/or the control unit.

17. The logo lamp assembly of claim 1, wherein the first logo lamp has an image mask.

18. The vehicle of claim 1, wherein
the interior surface is selected from a group consisting of a windshield, a window, a plastic surface, and a textile cover; and
the exterior surface of the vehicle is selected from a group consisting of a rear view device, a side mirror, a door, a camera pod, a trunk lid, a spoiler, a hood, a bumper, a side skirt, a roof rail, a pillar, and a fender.

19. A vehicle component selected from a group consisting of a rear view device, a side mirror, a door, a camera pod, a trunk lid, a spoiler, a hood, a bumper, a side skirt, a roof rail, a pillar, and a fender, comprising at least one logo lamp assembly of claim 1.

20. The vehicle component of claim 19, wherein a control unit is configured to control the logo lamp assembly depending on at least one of a driving situation, a driver condition, a driving purpose, a weather condition, or a traffic condition.

21. The vehicle component of claim 19, wherein the vehicle component is configured to be moveable relative to a vehicle to which it is mounted.

22. The vehicle component of claim 19, further comprising:
a sensor configured to sense at least one of a driving situation, a driver condition, a driving purpose, a weather condition, a traffic condition, or a movement of the vehicle component.

23. The vehicle component of claim 19, wherein movement of the vehicle component is at least partially compensated by an animated image output of one logo lamp assembly and/or by an image output of at least two logo lamp assemblies.

24. The vehicle component of claim 19, wherein at least one of the at least one logo lamp assembly or the vehicle component is configured to be controlled by a remote control unit or from inside the vehicle.

25. A vehicle comprising at least one logo lamp assembly according to claim 1.

26. A vehicle comprising at least one vehicle component according to claim 19.

27. The vehicle of claim 26, comprising at least two logo lamp assemblies mounted at different locations as different vehicle components.

28. The vehicle of claim 25, further comprising:
a control unit for controlling the at least one logo lamp assembly depending on at least one of a driving situation, a driver condition, a driving purpose, a weather condition, or a traffic condition.

29. The vehicle of claim 28, further comprising:
a sensor configured to sense at least one of the driving situation, the driver condition, the driving purpose, the weather condition, the traffic condition, or a movement of the vehicle component.

30. The vehicle of claim 25, wherein the at least one logo lamp assembly is configured to dynamically adapt an image output along a 3D surface.

31. The vehicle of claim 25, wherein an image output of one logo lamp assembly meets at least one image output of another logo lamp assembly.

32. The vehicle of claim 25, further comprising:
a sensor configured to sense at least one of a driving situation, a driver condition, a driving purpose, a weather condition, a traffic condition, or a movement of a vehicle component to which one logo lamp assembly (1) is mounted.

33. The vehicle of claim 25, further comprising:
an input unit for controlling at least one logo lamp assembly, the input unit being configured to input information to the at least one logo lamp assembly for display with an image output of the at least one logo lamp assembly.

34. The vehicle of claim 33, further comprising:
an output unit for outputting the information.

35. The vehicle of claim 26, wherein movement of a vehicle component is at least partially compensated by an animated image output of one logo lamp assembly and/or by an image output of at least two logo lamp assemblies.

* * * * *